United States Patent
Kim et al.

(10) Patent No.: US 7,311,450 B2
(45) Date of Patent: Dec. 25, 2007

(54) COLOR OPTICAL LINK USING TRANSPARENTLY JACKETED PLASTIC OPTICAL FIBER AND METHOD FOR ACHIEVING THE SAME

(75) Inventors: Mu Gyeom Kim, Gyeonggi-Do (KR); Jin Taek Hwang, Daejeon-Si (KR); Jin Sung Choi, Daejeon-Si (KR); Han Sol Cho, Daejeon-Si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 740 days.

(21) Appl. No.: 10/765,102

(22) Filed: Jan. 28, 2004

(65) Prior Publication Data
US 2006/0147161 A1 Jul. 6, 2006

(30) Foreign Application Priority Data
Aug. 19, 2003 (KR) ............... 10-2003-0057173

(51) Int. Cl.
*G02B 6/42* (2006.01)
*G02B 6/28* (2006.01)
*H04B 10/12* (2006.01)

(52) U.S. Cl. .................. 385/89; 385/46; 385/121; 398/142

(58) Field of Classification Search ............... None
See application file for complete search history.

(56) References Cited

U.S. PATENT DOCUMENTS

| | | | | |
|---|---|---|---|---|
| 4,676,594 A | * | 6/1987 | Presby | ............ 385/123 |
| 5,418,869 A | * | 5/1995 | Seike et al. | ............ 385/24 |
| 5,463,706 A | * | 10/1995 | Dumont et al. | ............ 385/32 |
| 6,614,972 B1 | * | 9/2003 | Lundin | ............ 385/121 |
| 6,618,530 B1 | * | 9/2003 | Lundin | ............ 385/121 |
| 2002/0172478 A1 | * | 11/2002 | Sahlin | ............ 385/115 |

\* cited by examiner

Primary Examiner—Rodney Bovernick
Assistant Examiner—Omar Rojas
(74) Attorney, Agent, or Firm—Harness, Dickey & Pierce, P.L.C.

(57) ABSTRACT

Disclosed is a color optical link using a transparently jacketed plastic optical fiber that optically transmits data and uses light, scattered and emitted to the outside, for the purpose of illumination, and a method for achieving the color optical link. The color optical link includes a first driver that receives digital or analog signals and a coloring signal in parallel and converts these signals into optical signals through a plurality of light sources. These light sources emit light of different wavelengths. A first POF coupler, connected at one end of the optical fiber, inputs the received optical signals into the optical fiber. A second POF coupler at the other end separates the transmitted optical signals into a plurality of optical signals and inputs these optical signals into a plurality of optical detectors having filters for separating the received signals into plural signals according to wavelength. A second driver converts the received optical signals into electrical signals.

11 Claims, 4 Drawing Sheets

COLOR OPTICAL LINK USING TRANSPARENTLY JACKETED PLASTIC OPTICAL FIBER AND METHOD FOR ACHIEVING THE SAME

BACKGROUND OF THE INVENTION

This non-provisional application claims priority under 35 U.S.C. § 119(a) on Patent Application No. 2003-57173 filed in Korea on Aug. 19, 2003, which is herein incorporated by reference.

1. Field of the Invention

The present invention relates to a color optical link using a transparently jacketed plastic optical fiber, which optically transmits data and uses light, scattered and emitted to the outside, as decorative illumination, and a method for achieving the color optical link.

2. Description of Related Art

As well known to those skilled in the art, communications used in homes are divided into wire communications and wireless communications. The wire communications are developed from a type using conventional copper wires to a type using glass optical fibers and/or POFs (Plastic Optical Fibers) serving as FITHs (Fibers In The Home).

One strand of the copper wires serves as one communication line. A cable using a plurality of strands of the copper wires for achieving several communication lines is thicker and possess a large weight. Furthermore, copper wire has a maximum transmission capacity of 500 Mbps, which is insufficient to meet the trend of multimedia requiring broadband data transmission.

In order to solve the above drawbacks, optical fibers have been proposed. The optical fibers independently transmit light having different wavelengths via a single communication line without the interference of signals between the respective wavelengths, thus advantageously simplifying the communication line. Since graded index types of the glass and plastic optical fibers have a data transmission capability of more than 1 Gbps, the graded index-type glass and plastic optical fibers play a leading role in the multimedia trend.

A glass optical fiber is a very thin glass fiber, which has poor bending properties. Accordingly, when the glass optical fiber is broken in a jacket, the broken glass optical fiber penetrates the jacket and is exposed to the outside, thus being very dangerous. Particularly, when the glass optical fiber is broken in use, it must be repaired using expensive equipment. Since the glass optical fiber, which is used in long-distance communication, functions to transmit data over a comparatively long distance, it transmits a signal having an infrared ray wavelength band with low optical loss, thus allowing the transmission of light to be invisible to the naked eye. Since one strand of the glass optical fiber for transmitting a single wavelength has a low price, there has been proposed a product of glass optical fibers comprising only one strand for transmitting one set of data. A product of glass optical fibers for transmitting data having multiple wavelengths has a high price, and thus it is an unrealistic product for use in homes, while being suitable for use as fibers in the home.

Plastic optical fibers have high optical loss when compared to glass optical fibers, and thus are incapable of being used in long-distance communication but are suitable for short-distance communication use in homes. Further, plastic optical fibers have good bending properties and is thus are not easily broken. However, when plastic optical fibers are broken, the broken parts can be easily reconnected. Plastic optical fibers transmit a signal having a visible light wavelength band with an optical loss 100 times as large as that of glass optical fibers, thus allowing a comparatively large amount of light to be emitted, in transmission, to the outside by scattering, which becomes visible to the naked eye. Most optical links, which are installed in homes, have a narrow bandwidth of approximately 50 Mbps. Accordingly, even when R (red), G (green), B (blue) and Y (yellow) lights are simultaneously transmitted using low-priced LED light sources, the total cost for installing the necessary LED light sources is inexpensive. Of course, glass optical fiber fibers can use LEDs. However, since it is difficult to achieve optical coupling between glass optical fibers with a core having a diameter of 50 µm and LED light sources having a diameter of 300 µm, glass optical fibers having a low capacitance must employ expensive coupling components in order to achieve the optical coupling therebetween. On the other hand, plastic optical fibers having a core with a large diameter is easily coupled with the LED light sources, thus allowing a large amount of light emitted from the light sources to be introduced thereinto for transmission.

The glass optical fiber is mainly used outdoors, thus generally including an opaque jacket for protecting the glass optical fiber from the external environment. On the other hand, the plastic optical fiber used in homes may include a transparent jacket for allowing a part of the transmitted light to be emitted to the outside and then used for the purpose of illumination.

Fraunhofer in Germany discloses a MUX/DEMUX (multiplexer/demultiplexer) using a plastic optical fiber for transmitting light having multiple wavelengths. Here, an optical link is achieved by inputting R, G and B LED signals, arranged in series, into an optical fiber. Since the R, G and B LED signals are arranged in series, this conventional optical link is disadvantageous in that it has an increased volume and the intensity of emitted light must be differently varied so as to compensate for light passing through a reflecting mirror.

SUMMARY OF THE INVENTION

Therefore, the present invention has been made in view of the above problems, and accordingly, it is an object of the present invention to provide a color optical link, in which a plastic optical fiber is coated with a transparent jacket, thus using light, scattered by the transparent jacket, for a decoratively illuminating purpose. Specifically, the plastic optical fiber, which is used to construct a FITH or a home network, serves as a communication line and as an illuminator for emitting light having a designated color so as to decoratively illuminate an indoor space.

It is another object of the present invention to provide a color optical link adapted by optical communication used in homes in order to rapidly construct a FITH, thus providing a value added for optical products using light.

It is yet another object of the present invention to provide a color optical link, which solves the problems of the conventional optical link disclosed by Fraunhofer in Germany, such as a its large volume and loss of light due to passing a reflecting mirror.

In accordance with one aspect of the present invention, the above and other objects can be accomplished by providing a color optical link using a transparently jacketed plastic optical fiber, comprising: a first driver for receiving digital or analog signals and a coloring signal in parallel and converting the received signals into optical signals through a plurality of light sources; a plurality of the light sources for emitting light having different wavelengths in order to output the optical signals; a first POF (plastic optical fibers) coupler for inputting a plurality of the optical signals received from a plurality of the light sources into the transparently jacketed plastic optical fiber; the transparently jacketed plastic optical fiber having one end connected to the first POF coupler and the other end connected to a second POF coupler; the second POF coupler being provided for separating an optical signal transmitted from the transparently jacketed plastic optical fiber into a plurality of optical signals and respectively inputting the optical signals into a plurality of optical detectors; the optical detectors respectively having filters for separating the received optical signal into plural signals according to wavelengths; and a second driver for receiving the optical signals from the optical detectors and converting the receiving optical signals into electrical signals.

Preferably, a the plurality of the light sources may be R, G and B LED light sources, or R, G, B and Y LED light sources. The number of the light sources may be the same as that of the electrical signals inputted in parallel into the first driver. Further, LEDs may be used as the plurality of the light sources at a low speed, and LDs, RCLEDs or VCSELs may be used as the plurality of light sources at a high speed.

Further, preferably, the first and second POF couplers may serve to input and output a plurality of optical signals to and from the light sources, and be designed such that a plurality of optical fibers for transmitting the plural optical signals are polished and bound in an optical fiber unit so that the optical fibers are uniformly arranged along a circumference of the optical fiber unit, thus inputting and outputting the plural optical signals in parallel to and from the transparently jacketed plastic optical fiber. The optical fibers may be attached to each other using a material having a refractivity lower than that of the core of the optical fibers so as to minimize crosstalk between the optical the fibers. Thus, the optical fibers for transmitting the plurality of optical signals are polished and bound so that the optical fibers are uniformly arranged along the circumference of the optical fiber unit.

Advantageously, the optical fiber unit of each of the first and second POF couplers may have a diameter larger than that of the plastic optical fiber in order to improve the coupling efficiency. The transparently jacketed plastic optical fiber may include a plastic optical fiber having high optical loss so as to emit a large amount of light to the outside when the transparently jacketed plastic optical fiber has a short transmission distance.

Preferably, a transparent jacket of the transparently jacketed plastic optical fiber may be coated on a naked plastic optical fiber by a post jacketing method so as to prevent the plastic optical fiber from damage from thermal stress generated in the jacketing of the plastic optical fiber. A contact area between a the transparent jacket and a the naked plastic optical fiber of the transparently jacketed plastic optical fiber may have a cycle or pattern so that light is emitted periodically or in a designated pattern.

Moreover, preferably, the first driver may employ a method for varying the total intensity of the signals or a method for offsetting the signals in order to achieve coloring, whereby light emitted from the transparently jacketed plastic optical fiber has a designated color. Further, the coloring may be varied by a designated signal inputted into the first driver.

In accordance with another aspect of the present invention, there is provided a method for achieving a color optical link using a transparently jacketed plastic optical fiber, comprising the steps of: (a) receiving digital or analog signals and a coloring signal in parallel and converting the received signals into optical signals through a plurality of light sources; (b) coupling optical signals transmitted from the plurality of the light sources into a single strand using a first POF coupler so that the optical signals are transmitted through the transparently jacketed plastic optical fiber; (c) emitting light corresponding to an optical loss, occurring when the optical signals from a the plurality of the light sources are transmitted through the transparently jacketed plastic optical fiber, to the outside through a transparent jacket coated on a naked plastic optical fiber of the transparently jacketed plastic optical fiber; (d) separating the optical signals, transmitted through the transparently jacketed plastic optical fiber, using a second POF coupler; (e) detecting a desired signal from the optical signals separated through the second POF coupler using optical detectors; and (f) converting the detected optical signals into electrical signals through a second driver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A preferred embodiment of the present invention will now be described in detail with reference to the accompanying drawings.

Figure 1:
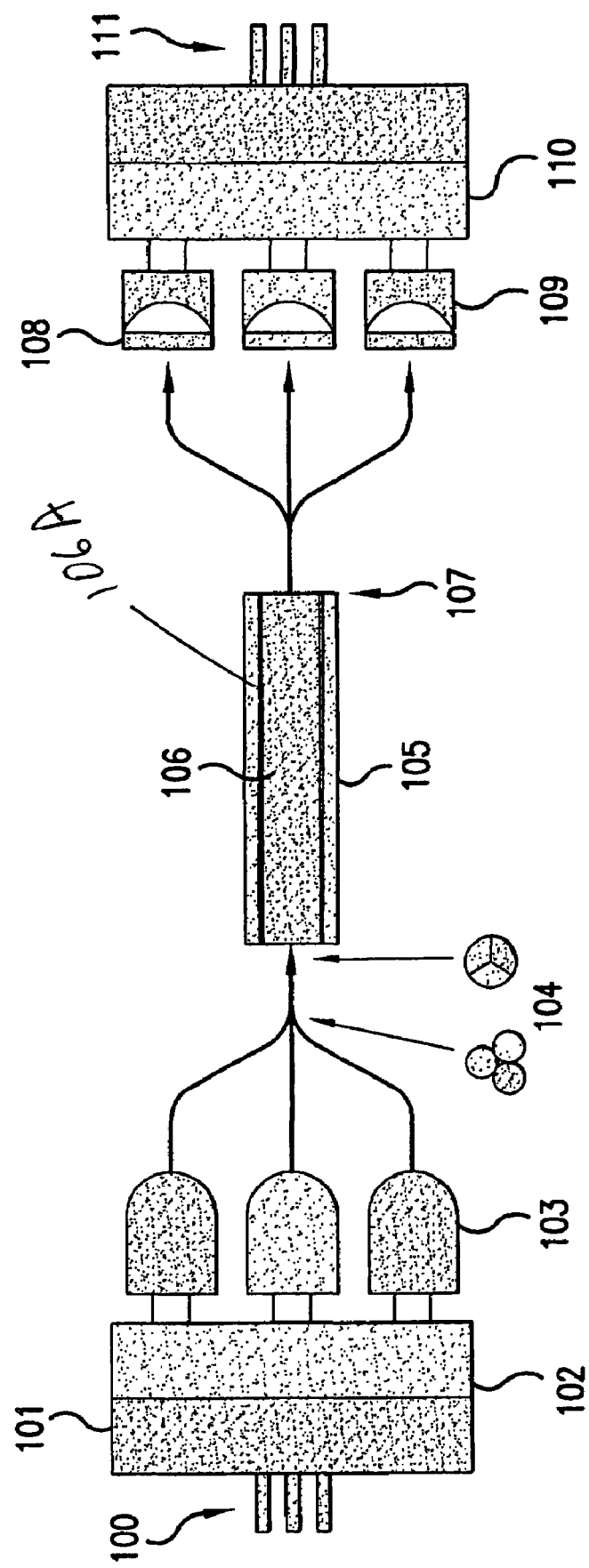
FIG. 1 is a schematic view of a color optical link using a transparently jacketed plastic optical fiber in accordance with the present invention.

FIG. 1 is a schematic view of a color optical link using a transparently jacketed plastic optical fiber in accordance with the present invention, which includes input electric signals 100, a cable connector 101, a first driver 102, RGB(Y) light sources 103, a first POF coupler 104 a transparent jacket 105, a naked plastic optical fiber 106, a second POF coupler 107, optical filters 108, optical detectors 109, a second driver 110, and output electrical signals 111.

Figure 1A:
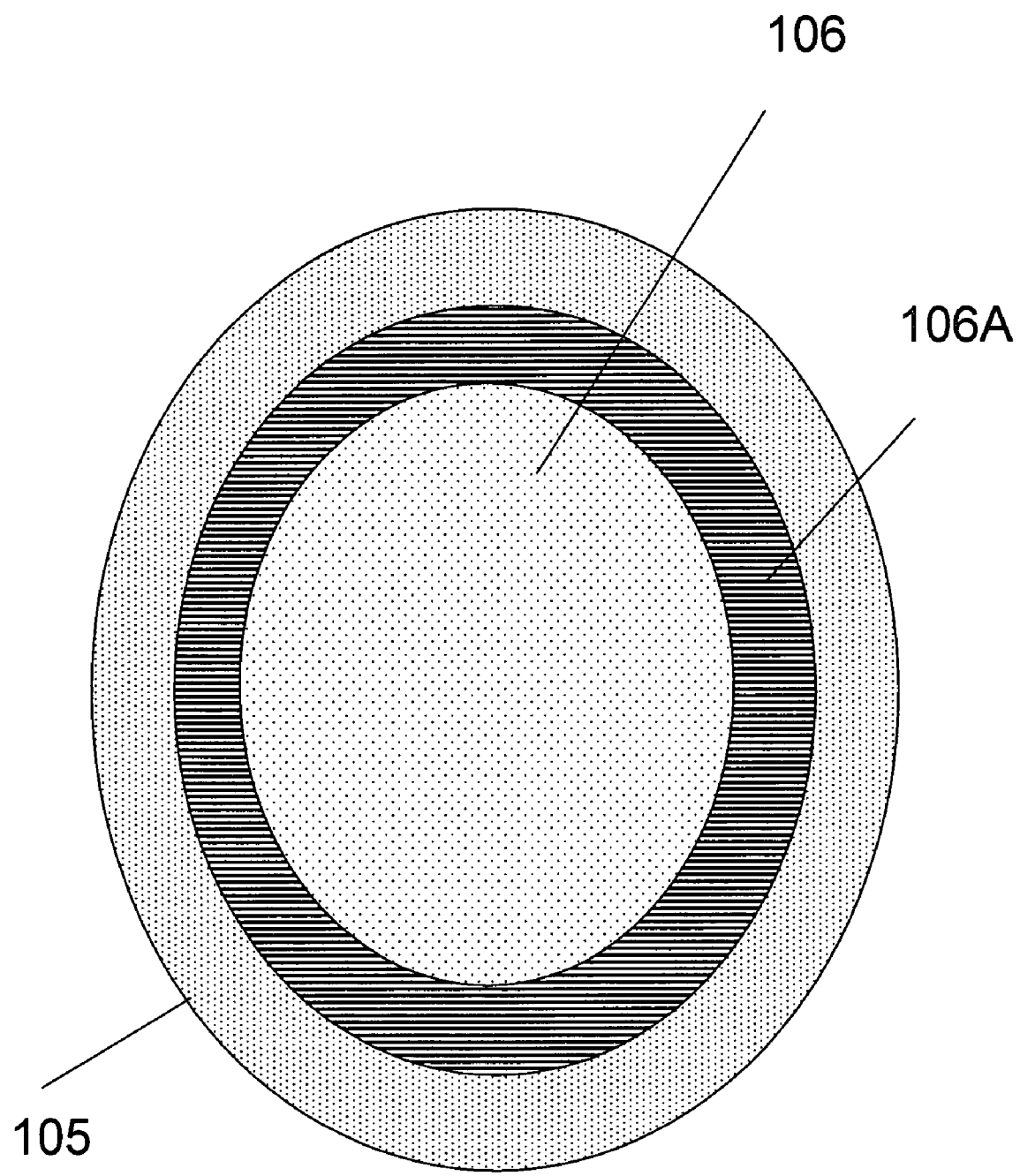
FIG. 1A is a schematic cross-sectional view of the transparently jacketed plastic optical fiber.

FIG. 1A is a schematic cross-sectional view of the transparently jacketed plastic optical fiber, which includes a naked plastic optical fiber 106, a transparent jacket 105 and a cycle or pattern 106A.

Figure 2:
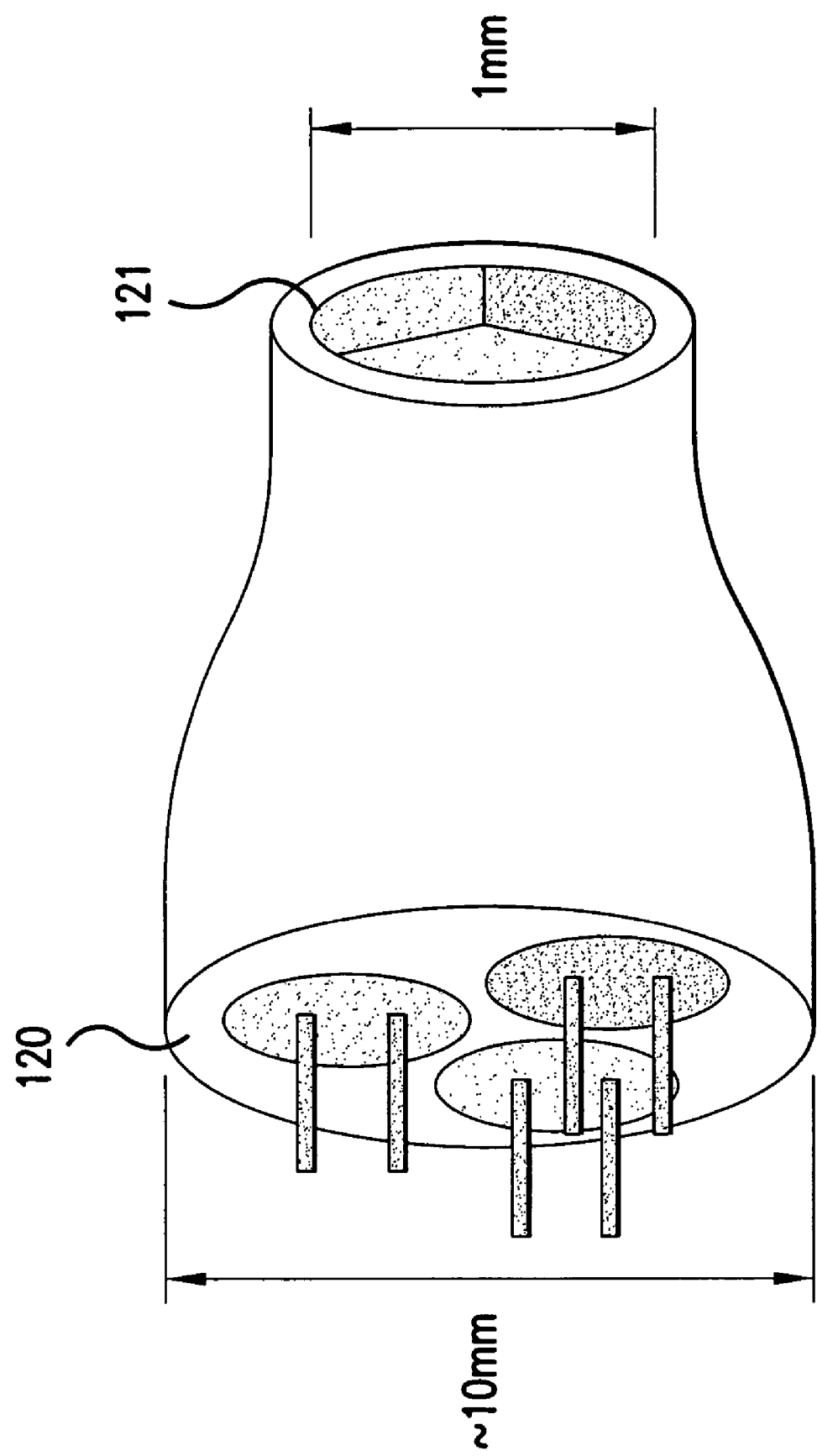
FIG. 2 is a schematic view of a POF coupler.

FIG. 2 is a schematic view of one of the first and second POF couplers 104 and 107, which includes a light source unit 120 for receiving optical signals transmitted from a plurality of the light sources 103 and optically coupling the signals in parallel, and an optical fiber unit 121 for outputting a coupling result to the plastic optical fiber 106 therethrough.

Figure 3:
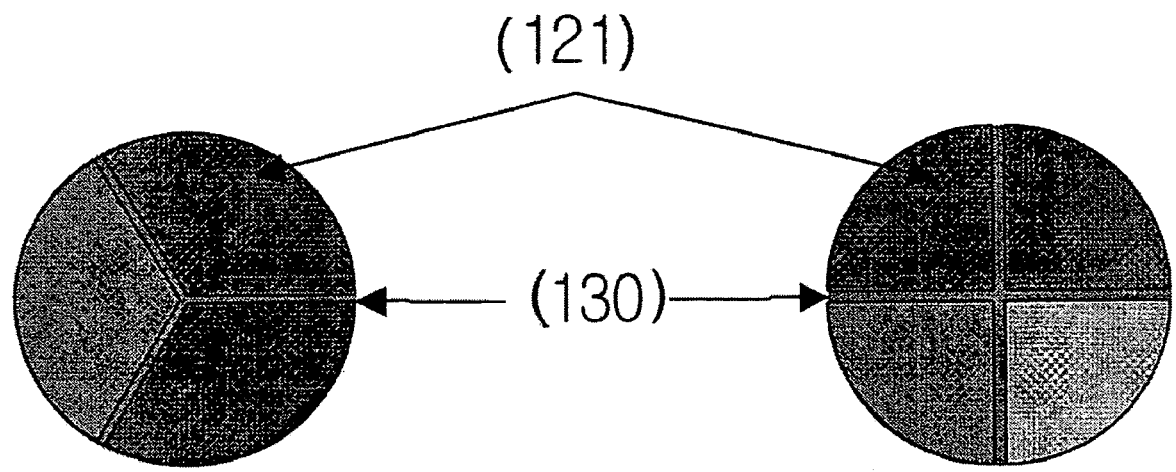
FIG. 3 is a cross-sectional view of an optical fiber unit of the POF coupler.

FIG. 3 is a cross-sectional view of the optical fiber unit 121 of one of the first and second POF couplers 104 and 107. Here, optical fibers introduced into the light source unit 120 of the first or second POF coupler 104 or 107 are polished so that the optical fibers are uniformly arranged along the circumference of the optical fiber unit 121, and then are attached to each other using epoxy 130 having a refractivity lower than that of a core.

Hereinafter, the technical characteristics of the color optical link using the transparently jacketed plastic optical fiber in accordance with the present invention will be described. First, the optical couplings between the plastic optical fiber 106 and the R, G, B and Y light sources 103 are achieved in parallel. Accordingly, when the number of light sources 103 is increased, a color optical link, in which the optical couplings between the plastic optical fibers and the light sources are achieved in series, has an increased length. However, since the plastic optical fibers are uniformly arranged in the optical fiber unit 121 in a circumferential direction, the color optical link of the present invention has only a slightly increased volume. Second, the color optical link of the present invention uses the transparent jacket 105, and light corresponding to the optical loss occurring in signal transmission is emitted to the outside, thus allowing the emitted light to decoratively illuminate an indoor space. Third, the first driver 102 varies the intensity of each light discharged from the operating light sources 103, thus achieving coloring, which causes the emitted light to have a desired color. Further, the color can be adjusted by varying the intensity of each light discharged from the light sources 103 for meeting the objects of the transmitted data. For example, in case that an acoustic signal is transmitted through the color optical link, the color is adjusted so as to correspond to an atmosphere of music, and in case that the color optical link is adapted by a keyboard, the colors are differently obtained and then transmitted to corresponding areas according to consonants, vowels, numbers, function keys, etc. Fourth, compared to light sources of the conventional MUX/DEMUX disclosed by Fraunhofer in Germany, which serve to independently transmit respective signals, the color optical link of the present invention uses signals emitted from the light sources 103 arranged in parallel, thus allowing a monitor to simultaneously use R, G and B signals.

Hereinafter, constitution of the color optical link using the transparently jacketed plastic optical fiber in accordance with a preferred embodiment of the present invention will be described.

light source: There are required various light sources 103 emitting light having different colors according to products adapting the color optical link. Conventional R, G, B and Y LEDs can be used. Here, the light sources 103 are produced in a small volume such that the light sources 103 in a chip state are coupled with the plastic optical fiber 106.

2) optical couplings between the light sources/optical detectors and the naked plastic optical fiber: The first POF coupler 104 serves to allow the light source unit 120 to receive optical signals transmitted from the plurality of light sources 103, and then to introduce the received optical signals to one strand of the plastic optical fiber 106 through the optical fiber unit 121. The first POF coupler 104 is designed such that the introduced optical fibers having the same number as the number of light sources 103 are polished so that the optical fibers are uniformly arranged along the circumference of the optical fiber unit 121 and are attached to each other using an epoxy 130 having a refractivity lower than that of the core. The first POF coupler 104 has a diameter the same or larger than that of the plastic optical fiber 106 so as to improve optical coupling efficiency between the light sources 103 and the plastic optical fiber 106. The second POF coupler 107 connected to the optical detectors 109 has the same structure as that of the first POF coupler 104.

3) plastic optical fiber: The plastic optical fiber 106 is coated with the jacket 105 made of a transparent resin so as to assist a part of the transmitted light to be emitted to the outside therethrough.

4) Optical detector: Si PIN optical detectors are used as the optical detectors 109, and optical filters 108 for filtering light having respective wavelengths are located in front of the optical detectors 109 so that the desired wavelengths can be selected by the optical filters 108.

5) coloring: The coloring is achieved by adjusting the intensity of the light by the first driver 102 by two methods. In one method, colors are made by varying quantities of light emitted from the respective light sources 103 by increasing the total intensity of the signals. In the other method, colors are made by varying quantities of light emitted from the respective light sources 103 by offsetting the signals. When the first driver 102 receives an external signal representing a desired color, the first driver 102 changes the intensity of light. Data representing the changed intensity of light are transmitted to the second driver 110 via a data stream.

In a preferred embodiment of the present invention, the first driver 102 adjusts the intensity of the light so as to achieve the coloring, and more specifically decreases the intensity of light so as to prevent the light from being emitted to the outside. Further, the first driver 102 adjusts the intensity of light whereby the light is emitted to the outside only when the signal passes through the optical link.

In a preferred embodiment of the present invention, in case the where data are transmitted in one direction along the transparently jacketed plastic optical fiber of the color optical link, the naked plastic optical fiber 106 of the transparently jacketed plastic optical fiber is made of one strand of a plastic optical fiber, and in the case that where data are transmitted in both directions along the transparently jacketed plastic optical fiber of the color optical link, the naked plastic optical fiber 106 of the transparently jacketed plastic optical fiber is made of two strands of the plastic optical fiber. Further, the naked plastic optical fiber 106 of the transparently jacketed plastic optical fiber may be a complex type cable further comprising two copper strands therein for feeding power therethrough.

Hereinafter, the principle of the color optical link using the transparently jacketed plastic optical fiber of the present invention will be described in detail with reference to the annexed drawings.

When electric signals 100 including digital or analog signals and a coloring signal are inputted into the connector 101, the first driver 102 drives a plurality of the light sources 103 so that the electric signals 100 are converted into optical signals by the light sources 103 and the coloring is achieved by changing the total intensity of the signals or by offsetting the signals based on the a coloring signal. Signals generated from the respective light sources 103 are transmitted to the light source unit 120 of the first POF coupler 104, and are then introduced through the optical fiber unit 121 into the plastic optical fiber 106 coated with the transparent jacket 105 when data such as the signals passes through the plastic optical fiber 106 coated with the transparent jacket 105, light having a desired color is emitted to the outside through the transparent jacket 105. Light emitted from the end of the plastic optical fiber 106 coated with the transparent jacket 105 is separated into a plurality of parts having the same intensity by the second POF coupler 107, and the respective, separated parts of light pass through the optical filters 108. Then, signals having a desired wavelength are detected by the optical detectors 109, and converted into electrical signals 111 by the second driver 110.

The color optical link of the present invention comprises two or more light sources so that signals emitted from the light sources are transmitted to the transparently jacketed plastic optical fiber in order to achieve coloring. As a result of tests, it is appreciated that light having various colors obtained by mingling two or more colors is emitted from the transparent jacket plastic optical fiber to the outside. Further, it is appreciated that the color optical link of the present invention transmits data in a data transmission capability of 50 Mbps at most using Si PIN optical detectors.

As apparent from the above description, the present invention provides a color optical link using a transparently jacketed plastic optical fiber adapted in a FITH, which emits light to the outside when optical data are transmitted therethrough, thus decoratively illuminating an indoor space. That is, the wire is not concealed, but is exposed to the outside as a decoration. Further, compared to the conventional optical link in which signals are transmitted in series, since signals are transmitted in parallel in the color optical link of the present invention, a the total volume of the color optical link is not increased, thus reducing the production cost as well as decoratively illuminating the indoor space. Moreover, compared to the Fraunhofer' conventional optical link employing an optical system, the color optical link of the present invention employs a plastic optical fiber connected to a plurality of light sources, thus reducing the production costs and volume of the optical link.

In the case where the color optical link using the transparently jacketed plastic optical fiber of the present invention is applied to a home theater apparatus, the home theater apparatus achieves coloring as well as providing video and acoustic data, thus maximizing appreciation. Further, the color optical link using the transparently jacketed plastic optical fiber may be applied to an apparatus for transmitting video and acoustic data, such as a projector or a TV, a keyboard, a mouse, a cellular phone, a monitor cable, a printer, and the like.

Although the preferred embodiments of the present invention have been disclosed for illustrative purposes, those skilled in the art will appreciate that various modifications, additions and substitutions are possible, without departing from the spirit and scope of the invention as disclosed in the accompanying claims.

What is claimed is:

1. A color optical link using a transparently jacketed plastic optical fiber, comprising:
    a plurality of the light sources for emitting light having different wavelengths in order to output a plurality of optical signals;
    a first driver for receiving digital or analog signals and a coloring signal in parallel and converting the received signals into the plurality of optical signals through a said plurality of light sources;
    a first POF coupler for inputting the plurality of the optical signals received from the plurality of the light sources into the transparently jacketed plastic optical fiber;
    the transparently jacketed plastic optical fiber having one end connected to the first POF coupler and the other end connected to a second POF coupler,
    said second POF coupler being provided for separating the optical signal transmitted from the transparently jacketed plastic optical fiber into a plurality of optical signals and respectively inputting the optical signals into a plurality of optical detectors, said plurality of the optical detectors respectively having filters for separating the received optical signal into a plurality of signals according to wavelengths;
    said first and second POF couplers are designed such that a plurality of optical fibers for transmitting the plurality of optical signals are polished and bound into an optical fiber unit so that the optical fibers are uniformly arranged along a circumference of the optical fiber unit, thus inputting and outputting the plurality of optical signals in parallel to and from the transparently jacketed plastic optical fiber; and
    a second driver for receiving the optical signals from the optical detectors and converting the receiving optical signals into electrical signals.

2. The color optical link as set forth in claim 1,
wherein the number of the light sources is the same as the number of electrical signals inputted in parallel into the first driver.

3. The color optical link as set forth in claim 1,
wherein LEDs are used as the plurality of light sources at low speed, and LDs, RCLEDs or VCSELs are used as the plurality of the light sources at high speed.

4. The color optical link as set forth in claim 1,
wherein the optical fiber unit has a diameter larger than that of the transparently jacketed plastic optical fiber in order to improve coupling efficiency.

5. The color optical link as set forth in claim 1,
wherein the optical fibers are attached to each other using a material having a refractivity lower than that of a core of the optical fibers so as to minimize crosstalk between the plurality of optical fibers, and the optical fibers for transmitting the plurality of optical signals are polished and bound so that the optical fibers are uniformly arranged along the periphery of the optical fiber unit.

6. The color optical link as set forth in claim 1,
wherein the transparently jacketed plastic optical fiber includes a plastic optical fiber having a high optical loss so as to emit a large amount of light to the outside when the transparently jacketed plastic optical fiber has a short transmission distance.

7. The color optical link as set forth in claim 1,
wherein the transparent jacket of the transparently jacketed plastic optical fiber is coated on a naked plastic optical fiber by a post jacketing method so as to prevent the plastic optical fiber from damage from thermal stress generated in jacketing the naked plastic optical fiber.

8. The color optical link as set forth in claim 1,
wherein a contact area between the transparent jacket and the naked plastic optical fiber of the transparently jacketed plastic optical fiber has a cycle or pattern so that light is emitted periodically or in pattern.

9. The color optical link as set forth in claim 1,
wherein the first driver varies the total intensity of the signals or varies the signals in order to achieve coloring.

10. The color optical link as set forth in claim 1, wherein coloring is varied by the coloring signal inputted into the first driver.

11. A method for achieving a color optical link using a transparently jacketed plastic optical fiber, comprising the steps of:

(a) providing digital or analog signals and a coloring signal in parallel and converting said signals into optical signals through a plurality of light sources;

(b) coupling optical signals transmitted from a plurality of the light sources into a single strand using a first POF coupler so that the optical signals are transmitted through the transparently jacketed plastic optical fiber;

(c) emitting light corresponding to the optical loss occurring when the optical signals from a plurality of the light sources are transmitted through the transparently jacketed plastic optical fiber to the outside through a transparent jacket coated on naked plastic optical fiber of the transparently jacketed plastic optical fiber;

(d) separating the optical signals, transmitted through the transparently jacketed plastic optical fiber, using a second POF coupler, said first and second POF couplers designed such that a plurality of optical fibers for transmitting the plurality of optical signals are polished and bound into an optical fiber unit so that the optical fibers are uniformly arranged along a circumference of the optical fiber unit, thus inputting and outputting the plurality of optical signals in parallel to and from the transparently jacketed plastic optical fiber;

(e) detecting a desired signal from the optical signals separated through the second POF coupler using optical detectors; and (f) converting the detected optical signals into electric signals through a second driver.

* * * * *